United States Patent [19]

Kurk

[11] Patent Number: 4,640,161
[45] Date of Patent: Feb. 3, 1987

[54] WOOD CUTTING APPARATUS

[76] Inventor: Robert L. Kurk, 3524 Hanover Rd., Jeffersontown, Ky. 40299

[21] Appl. No.: 739,521

[22] Filed: May 31, 1985

[51] Int. Cl.$^4$ .............................................. B27B 5/00
[52] U.S. Cl. ........................................ 83/104; 83/153; 83/155; 83/157; 83/160; 83/213; 83/471.1
[58] Field of Search ................. 83/104, 107, 153, 157, 83/160, 373, 213, 449, 471.1, 519, 581, 471.2, 471.3, 155, 155.1; 144/216

[56] References Cited

U.S. PATENT DOCUMENTS

| | | | |
|---|---|---|---|
| 3,459,082 | 8/1969 | Smith et al. | 83/471.2 X |
| 3,563,121 | 2/1971 | Cox | 83/449 X |
| 4,224,849 | 9/1980 | Loser | 83/104 X |

FOREIGN PATENT DOCUMENTS

| | | | |
|---|---|---|---|
| 2161362 | 2/1973 | Fed. Rep. of Germany | 144/216 |
| 2346573 | 3/1975 | Fed. Rep. of Germany | 83/449 |

*Primary Examiner*—James M. Meister
*Attorney, Agent, or Firm*—Charles G. Lamb

[57] ABSTRACT

A wood cutting apparatus for cutting a workpiece from a stock of material includes a guide device for moving the stock material through the apparatus and a pair of saws located to opposite sides of the guide device for movement across the stock material to cut the workpieces to a selected configuration off the stock material. A movable workpiece holder is located at the end of the guide device which holds and supports the portion of the stock material composing the piece being cut off the stock material. An ejector ejects a severed workpiece from the workpiece holder as the workpiece holder moves.

19 Claims, 15 Drawing Figures

WOOD CUTTING APPARATUS

BACKGROUND OF THE INVENTION

1. Field of the Invention

The present invention relates generally to sawing machines, and more particularly, to a saw device for severing a workpiece of wood of selected configuration from a stock of material.

2. Description of the Prior Art

Various types of sawing devices are known. The following five U.S. patents are exemplary of the art.

U.S. Pat. No. 150,223 teaches a mitering machine having two circular saws located at 90° to each other. The work table includes workpiece holders which are adjustable along the saw blades and the work table can be lowered away from the saw blades and raised toward the saw blades.

U.S. Pat. No. 403,462 teaches a miter machine which has two circular saws located at 90° to each other above a vertically movable work table. The work table is moved upwardly to bring the wood to be cut into contact with the same.

U.S. Pat. No. 2,722,731 teaches a sawing machine having two circular saws located at 90° to each other. The saws are mounted over a work table on a pedestal. The saws are vertically movable toward and away from the work table. Work piece locating means are adjustably connected to the table for movement along the saw blades.

U.S. Pat. No. 2,856,973 teaches a mitering cut off saw having two radial arm saws located at 90° to each other mounted over a work table. The saws are affixed to a bracket which is received in a channel formed in the top surface of the the work table. The radial arm saws can also be tilted upwardly away from the work table or downwardly toward the work table by a pneumatic system.

U.S. Pat. No. 2,940,485 teaches a mitering cut off saw apparatus having two radial arm saws located at 90° to each other over a work table. A work piece stop is adjustably mounted to the table to provide for the location of a workpiece at selected locations on the work table relative to the saws.

The above-discussed saw devices are not particularly well suited to an efficient high volume manufacturing operation.

SUMMARY OF THE INVENTION

The present invention recognizes the drawbacks of the prior art in a high volume production environment and provides a solution overcoming these drawbacks.

More particularly, the present invention provides a saw apparatus for cutting a workpiece from a stock of material comprising stock material guide means for guiding the movement of the stock material along a predetermined path; a pair of saws located to opposite lateral sides of the path determined by the stock material guide means, each of the saws being adapted for movement across the guide means to cut a workpiece off of the stock material located on the guide means; a movable workpiece holder located at the end of the guide means defining the downstream end of the predetermined path, the workpiece holder being adapted for movement back and forth of the guide means at the downstream end of the predetermined path to engage and support the portion of the stock material composing the workpiece being cut-off the stock material; and means for ejecting the severed workpiece from the workpiece holder as the workpiece holder moves.

BRIEF DESCRIPTION OF THE DRAWINGS

The present invention will become even more clear upon reference to the following description and in conjunction with the accompanying drawing wherein.

DETAILED DESCRIPTION OF A PREFERRED EMBODIMENT

With reference to FIGS. 1, 2, 4 and 5, there is shown a saw apparatus generally denoted as the numeral 10, of the present invention, for cutting a workpiece 12 from a stock of material 14. As illustrated, the stock of material 14 is a length of wood, and the workpiece 12 is a triangularly shaped piece cut-off the end of the length of wood. It should be clearly understood, however, that the present invention is not limited in any way to a saw apparatus for cutting triangular workpieces from a length of wood.

Figure 6:
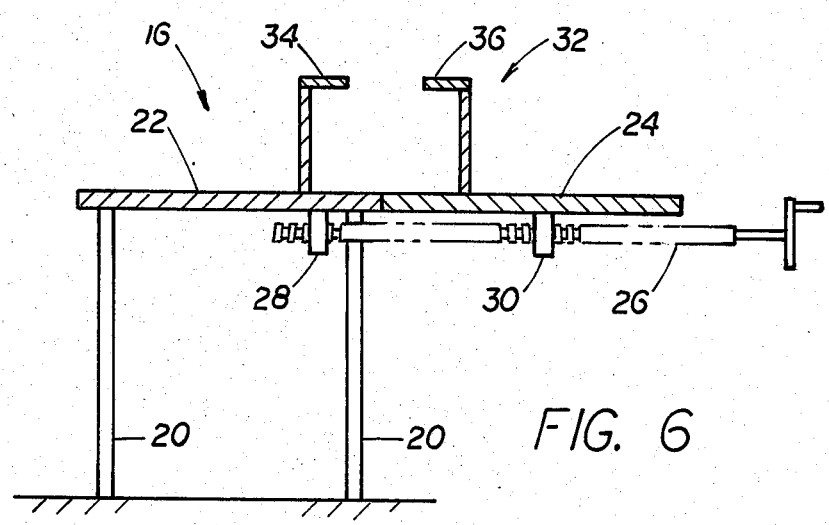
FIG. 6 is an enlarged transverse cross-sectional view of the apparatus of FIG. 1 as seen in the direction of arrows 6—6 in FIGS. 1 and 5.

With reference to FIGS. 1, 2, 4 and 5, the cut-off saw apparatus 10 includes a table 16 having a table top 18 supported above a floor by table legs 20. The table top 18 is split longitudinally into two table top sections 22 and 24. The first table top section 22 is stationary and the second table top section 24 is mounted for movement toward and away from the first table top section 22. The movable table top section 24 can be mounted for movement relative to the stationary table top section 22 by virtually any convenient means. By way of example, as shown in FIG. 6, the movable table top section 24 is mounted for movement by means of jack screws 26. One end of the each jack screw 26 is affixed to the stationary table top section 22 in appropriate fittings 28 attached to the bottom surface of the stationary fittings 28 attached to the bottom surface of the stationary table top section 22, and extend horizontally from the side edge of the stationary table top section 22 toward the movable table top section 24 in the direction of movement of the movable table top section 24. Fixed position pinion blocks 30 are attached to the bottom surface of the movable table top section 24 and receive the jaw screws 26. Thus, as the jack screws 26 are turned, they cooperate with the pinion blocks 30 to move the movable table top section 24 toward or away from the stationary table top section 22 depending upon the direction in which the jack screws 26 are turned.

With continued reference to FIGS. 1, 2, 4 and 5, the saw apparatus 20 includes stock material guide means, generally denoted as the numeral 32 which defines a predetermined path of movement of the length of stock material 14 along the top surface of the table top 18 through the saw apparatus 10. As shown, the guide means 32 comprises two, spaced apart, parallel, horizontal rails 34 and 36 located on the table top 18 for supporting the stock material 14, and a located fixutre, generally denoted as the numeral 38, associated with each of the rails 34 and 36 for holding the stock material 14 in place on the rails 34 and 36. The locating fixture 38 includes one locating block 40 associated with one of the rails 34 and another locating block 42 associated with the other rail 36. The locating blocks 40 and 42 project to an elevation above the top surface of the rails 34 and 36 to define mutually facing stock abutment surfaces 44 and 46, respectively, which cooperate to engage at least a portion of the length of stock material 14 therebetween to keep the stock material tracking properly along the guide rails 34 and 36. One guide rail 34 is affixed to the top surface of the stationary table top section 22 and the other guide rail 36 is affixed to the top surface of the movable table top section 24 so that the distance between the guide rails 34 and 36 can be changed to accommodate stock material 14 of different widths by moving the movable table top section 24 toward and away from the stationary table top section 22 as discussed above.

Figure 1:
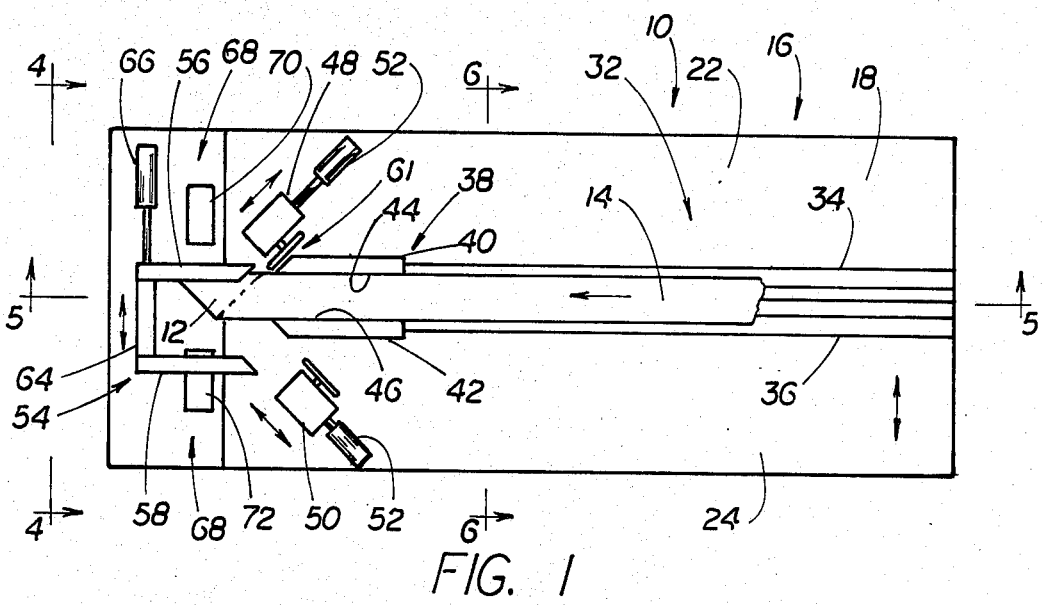
FIG. 1 is a diagrammatic plan view of the saw apparatus of the present invention with the movable workpiece holder shifted to one position preparatory for cutting.
Figure 2:
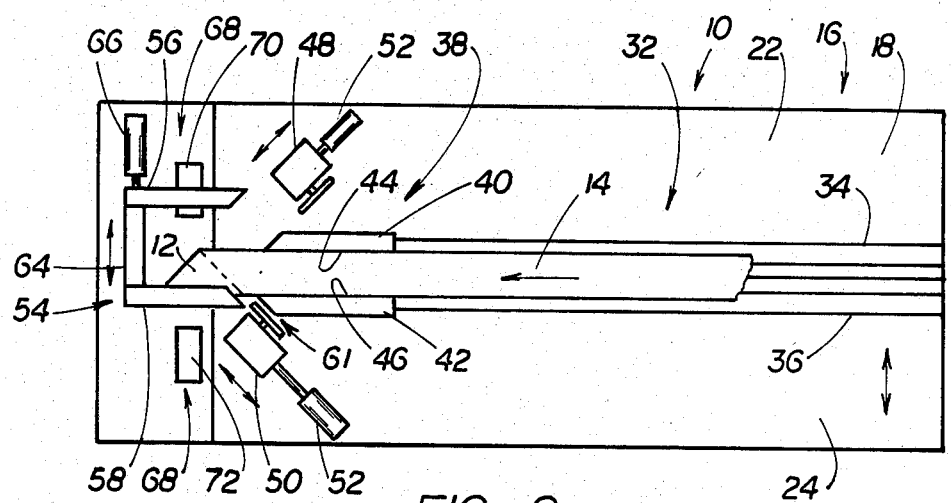
FIG. 2 is a diagrammatic plan view of the saw apparatus of the present invention with the movable workpiece holder shifted to another position preparatory for cutting.

A pair of saws 48 and 50 are mounted to the top surface of the, table top 16 and are located to opposite lateral sides of the path of the movement of the stock material defined by the rails 34 and 36 of the guide means 32. One saw 48 is mounted to the stationary table top section 22 next to the guide rail 34, and the other one of the cut-off saws 50 is mounted to the movable table top section 24 next to the guide rail 36. Each of the saws 48 and 50 are adapted for movement across the stock material path defined by the guide rails 34 and 36 in order to cut a workpiece 12 off of the stock material 14 located on the guide rails 34 and 36. The saws 48 and 50 can be of virtually any type. For example, it is contemplated that they could be band saws adapted to be selectively lowered to a cutting position in contact with the stock material 14, and raised above the stock material 14 to allow for the feeding or advancement of the stock material 14 along the guide rails 34 and 36. As shown in FIGS. 1, 2 and 6, the saws 34 and 36 are shown as radial arm saws having rotating cutting blades. The cutting blade is movable along the radial arm of the saw toward and away from the stock material 14 to be cut into individual workpieces 12. The angle between the longitudinal axis of the guide rails 34 and 36 and the direction of movement of the saw blades along the radial saw arms can be changed in order to change the angle at which the workpiece 12 is cut-off the stock material 14. As shown in FIGS. 1 and 2, the saws 48 and 50 are oriented to make 45° angle cuts through the stock material 14 thereby producing triangularly shaped workpiece 12. The saws 48 and 50 can be provided with saw moving means, such as hydraulic or pneumation cylinder devices 52 to automatically and alternately move first one saw 48 back and forth across the stock material 16 and then the other one of the saws 50 back and forth across the stock material 16 thereby sequentially cutting workpieces 12 from the stock material 14.

A movable workpiece holder, generally denoted as the numeral 54, is located at the end of the guide means 32 defining the downstream end of the predetermined path of movement of the stock material 14. The workpiece holder 54 is adapted for movement transversely of and back and forth across the rails 34 and 36 of the guide means 32 at the downstream end of the path determined by the rails 34 and 36 to alternately engage opposited sides of and support the end portion of the stock material 14 composing the workpiece 12 being cut-off the stock material 14.

With reference to FIGS. 1, 2, 3, 4 and 5, the workpiece holder 54 includes two spaced apart generally parallel alongated side channel members 56 and 58 which are substantially parallel to the guide rails 34 and 36. Each side channel member 56 and 58 forms a generally U-shaped channel 60 and 62, respectively. The longitudinal open sides of the U-shaped channels 60 and 62 face each other across the space separating the side channel members 56 and 58. The elongated channel members 56 and 58 are interconnected by a transverse beam 64. In addition, each U-shaped channel 60 and 62 in the channel members 56 and 58 is open at its end located at the downstream end of the guide means 32. As the workpiece holder 54 moves transversely back and forth across the ends of the rails 34 and 36 of the guide means 32, the work holder channel members 56 and 58 alternately move into and out of generally longitudinal alignment with the guide rails 34 and 36, respectively, so that the opposite longitudinal sides of the portion of the stock material 14 comprising the workpiece 12 to be cut-off will alternately received in the U-shaped channels 60 and 62 of the rails 34 and 36, respectively. When a channel member 56 or 58 is in longitudinal alignment with a guide rail 34 or 36, the end of the channel member is spaced a distance, denoted by the number 61, from the end of the guide rail aligned therewith by a distance sufficient to allow the passage therebetween of the saw. Thus, the portion of the stock material 14 comprising the workpiece 12 to be cut-off the stock material 14 is supported in one or the other of the U-shaped channels 60 and 62 as one or the other of the saws 48 and 50 cut through the stock material 14.

The workpiece holder 54 can be moved transversely of or across the ends of the stock material guide rails 34 and 36 by virtually any convenient means. As shown, the workpiece holder 54 is moved by means of a hydraulic or pneumatic cylinder device 66 which has the end of its piston rod connected to the transverse support beam 64 of the workpiece holder 54.

The movement of the cut-off saws 48 and 50, and movement of the workpiece holder 54 can be coordinated by appropriately located limit switces and valves (not shown) which are well known in the art. Therefore, for the sake of brevity and clearness of understanding of the present invention, the various known methods of cooperatively moving the saws and workpiece holder will not be discussed.

After a workpiece 12 has been severed from the stock material 14, it is ejected from the workpiece holder 54 by ejector means 68. As shown, the ejector means 68 comprises two stationary ejector bars 70 and 72. Each of the ejector bars 70 and 72 are located next to a different one of the side channel members 56 and 58, respectively. The stationary ejector bar 70 extends toward the side channel member 56 in longitudinal alignment with an ejector bar receiving aperture 74 formed in the side channel member 56 through the longitudinal side of the channel member 56 open to the U-shaped channel 60. Similarly, the stationary ejector bar 72 extends toward the other side channel member 58 in longitudinal alignment with an ejector bar receiving aperture 76 formed in the side channel member 58 through the longitudinal side of the channel member 58 open to the U-shaped channel 62.

Figure 3:
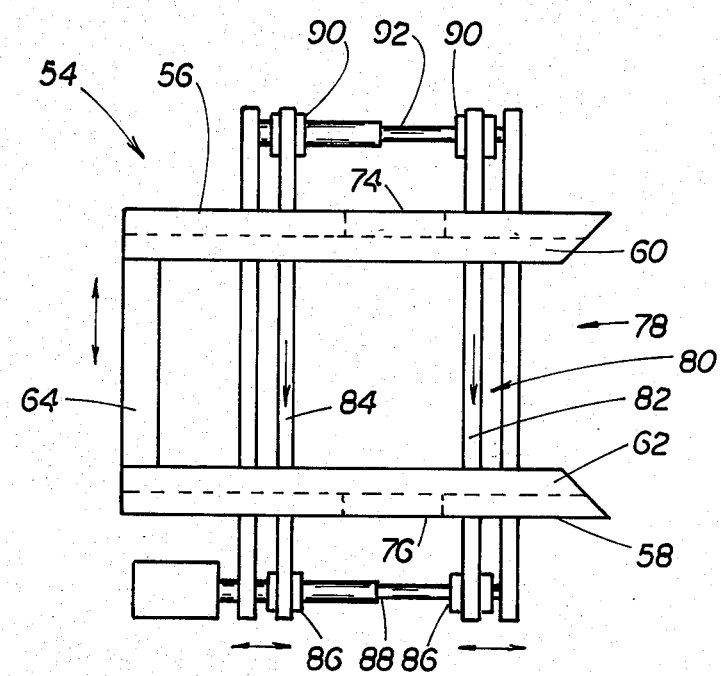
FIG. 3 is an enlarged diagrammatic plan view of the workpiece holder and a workpiece transporting conveyor located therebeneath.
Figure 4:
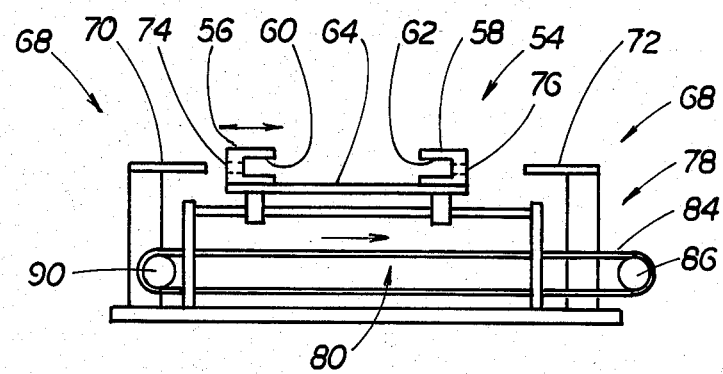
FIG. 4 is an enlarged end view of the saw apparatus of FIG. 1 as seen in the direction of arrows 4—4 in FIG. 1.
Figure 5:
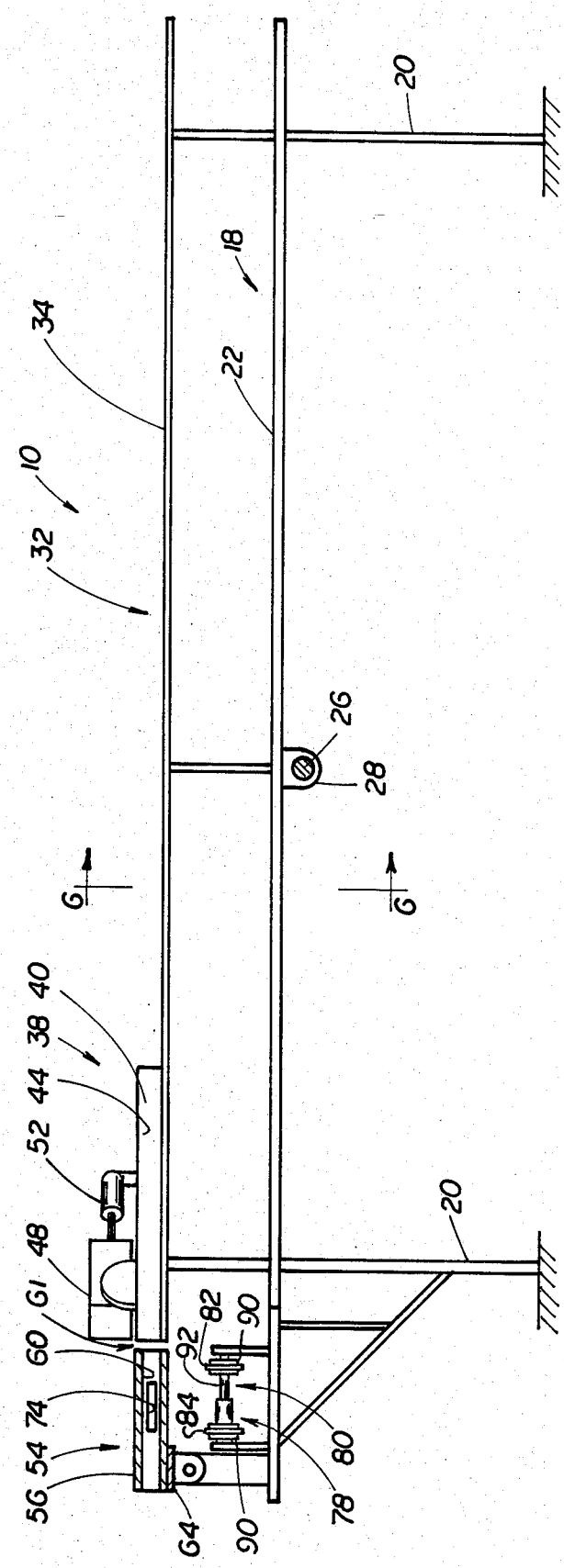
FIG. 5 is a cross-sectional side view of the saw apparatus of FIG. 1 as seen in the direction of arrows 5—5 in FIG. 1.

Now with reference to FIGS. 3, 4 and 5, the apparatus 10 also includes a workpiece conveying means, generally denoted as the numeral 78, located generally beneath the workpiece holder 54 for receiving a workpiece 12 ejected from the workpiece holder 54 and for moving the workpiece 12 to another location. The conveying means 78, as shown, comprises an endless belt device 80 located with its longitudinal axis transverse to the stock material guide rails 34 and 36 and, therefore, in line with the movement of the workpiece holder 54. The endless belt device 80 is illustrated as comprising two spaced apart, parallel head pulleys 86 mounted on a common telescoping shaft 88 and about individual tail pulleys 90, and trained about individual tail pulleys 90 mounted on a common telescoping shaft 92. The head pulley shaft 88 and tail pulley shaft 92 can be telescopically extended and compressed to selectively change the distance between the endless conveyor bands 82 and 84 to accomodate different sized workpiece 12. Thus, workpieces 12 of a smaller than preselected size will be rejected from the endless belt conveyor device 80 by falling through the space between the conveyor device 80 by falling through the space between the conveyor bands 82 and 84 so that they will not be comingled with workpieces of a larger size conveyed by the conveyor belt device 80.

In operation of the saw apparatus 10, the stock material 14 is incrementally indexed through the apparatus on the guide rails 34 and 36 past the saws 48 and 50. After a desired length of stock material 14 comprising the workpiece 12 has been indexed past the cut-off saws, the workpiece holder 54 is moved transversely until one side channel member, for example side channel member 56, is in longitudinal alignment with one of the guide rails, for example guide rail 34 of the guide means such that one longitudinal edge of the stock material 133 is received in the U-shaped channel 60 formed in the channel member 56. One of the saws, for example, saw 48 is moved, by the hydraulic cylinder device 52, across the stock material 14 in the space 61 between the adjoining ends of the channel member 56 and guide rail 34 to sever the workpiece 12 from the stock material 14. After the saw 48 is retracted by the hydraulic cylinder device 52, the workpiece holder 54 is moved, by the hydraulic cylinder device 66, transversely to position the other side channel member 58 in longitudinal alignment with the other guide rail 36 such that the other longitudinal edge of the stock material 14 is received in the U-shaped channel 62 formed in the channel member 58. As the workpiece holder 54 moves to position the other side channel member 58 in alignment with the other guide rail 36, the side channel member 56 holding the workpiece 12 in the U-shaped channel 60 moves toward the stationary ejector bar 70. The free end of the stationary ejector bar 70 moves through the aperture 74 in the side channel member 56 pushing the workpiece 12 from the U-shaped channel 60. The ejected workpiece 12 then falls downwardly onto the conveyor belt device 80 to be transferred to another location. As the workpiece holder 54 moves, the stock material 14 is again indexed to position a new portion of material 14 past the saws corresponding to another workpiece 12 to be cut-off. The other saw 50 is moved by the hydraulic cylinder device 66 across the stock material 14 in the space 61 between the adjoining ends of the channel member 58 and the guide rail 36 to sever the workpiece 12 from the stock material 14. After the saw 50 is restracted by the hydraulic cylinder device 52, the work holder 54 is again moved by the hydraulic cylinder device 66, transversely to again position the side channel 56 in longitudinal alignment with the guide rail 34, and the stock material 14 is again indexed to position another portion of the stock material 14 past the saws. As the workpiece holder 54 thus moves, the side channel member 58 holding the workpiece 12 in the U-shaped channel 62 moves toward the stationary ejector bar 72. The free end of the stationary ejector bar 72 moves through the aperture 76 in the side channel member 58 pushing the workpiece 12 from the U-shaped channel 62. The ejected workpiece 12 then falls downwardly onto the conveyor belt device 80 to be transferred to another location. The above described sequence continues with alternating saws 48 and 50 cutting workpiece 12 from the stock material 14, and with the workpiece holder 54 moving to alternately position the side channel members 56 and 58 in position to engage and hold the workpiece 12 being cut off the stock material 14.

With reference to FIGS. 7 through 11, there is shown another advantageous embodiment of a workpiece holder, generally denoted as the numeral 154, located at the end of the guide means 32 defining the downstream end of the predetermined path of movement of the stock material 14. The workpiece holder 154 is adapted for movement transversely of the rails 34 and 36 of the guide means 32 at the downstream end of the path determined by the rails 34 and 36 to alternately engage opposite sides of and support the end portion of the stock material 14 composing the workpiece 12 being cut-off the stock material 14.

With continued reference to FIGS. 7 through 11, the workpiece holder 154 includes two spaced apart generally parallel elongated side channel members 156 and 158 which are substantially parallel to the guide rails 34 and 36. Each side channel member 156 and 158 is formed with a longitudinally extending ledge 160 and 162, respectively. The longitudinal ledges 160 and 162 face each other across the space separating the side channel members 156 and 158. The channel members 156 and 158 of the workpiece holder 154 simultaneously move toward and away from each other transversely across the ends of the rails 34 and 36 of the guide means 32. When the channel members 156 and 58 have moved toward each other into the first or workpiece support position (see FIGS. 7, 8 and 11), the longitudinal ledges 160 and 162 of the channel members 156 and 158 are in generally longitudinal alignment with the guide rails 34 and 36, respectively, with the space between the ledges 160 and 162 being less than the width of the workpiece 12. When the channel members 156 and 158 have moved away from each other into the second or workpiece release position (see FIGS. 9 and 10), the longitudinal ledges 160 and 162 of the channel members 156 and 158 are out of longitudinal alignment with the guide rails 34 and 36, respectively, with the space between the ledges 160 and 162 being greater than the width of the wporkpiece 12. Thus, when the channel members 156 and 158 are in the workpiece support position (see FIGS. 7, 8 and 11), at least a portion of the opposite longitudinal sides of the part of the stock material 14 composing the workpiece 12 being cut-off the stock material is supported on the opposite ledges 160 and 162 of the channel members 160 and 162.

The channel members 156 and 158 of the workpiece holder 154 can be moved by virtually any convenient means. As shown, the channel member 156 is moved by means of a hydraulic pneumatic cylinder device 166 which has the end of its piston rod connected to the channel member 156, and the channel member 158 is moved by means of a similar hydraulic or pneumatic cylinder device 167 which has the end of its piston rod connected to the channel member 158.

Figure 7:
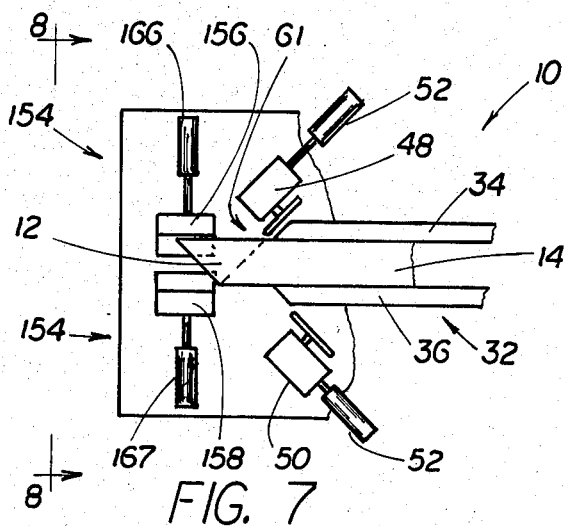
FIG. 7 is a diagrammatic plan view of another advantageous embodiment of a workpiece holder in a first position holding a workpiece.
Figure 8:
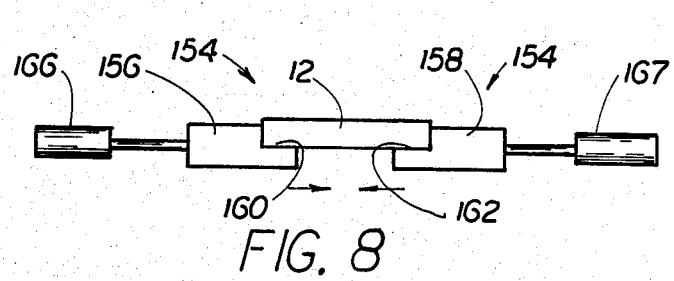
FIG. 8 is an enlarged end view of the workpiece holder of FIG. 7 in the first position.
Figure 9:
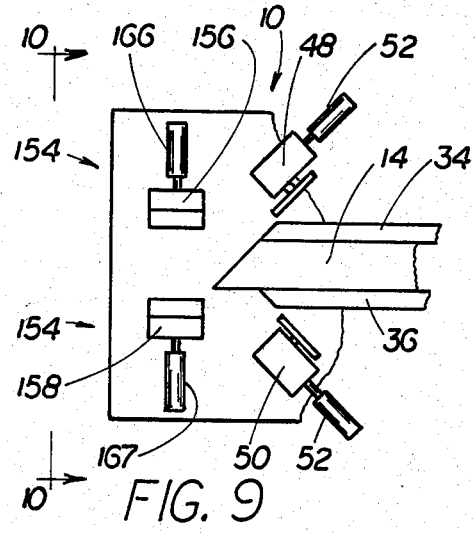
FIG. 9 is a diagrammatic plan view of the workpiece holder of FIG. 7, but in a second position releasing the workpiece.
Figure 11:
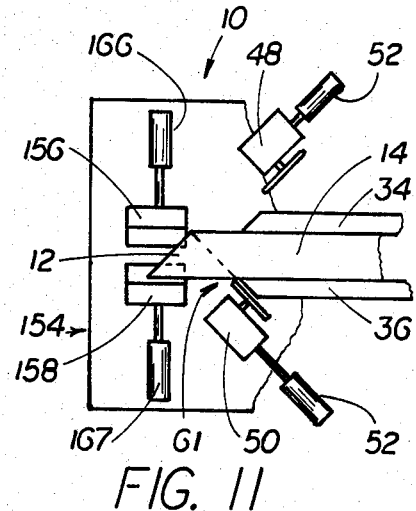
FIG. 11 is a diagrammatic plan view of the workpiece holder of FIG. 7 returned to the first application holding the next sequential workpiece.
Figure 10:
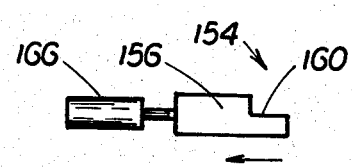
FIG. 10 is an enlarged end view of the workpiece holder of FIG. 9 in the second position.
Figure 10:
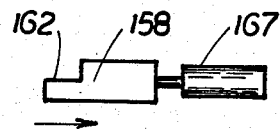
Figure 12:
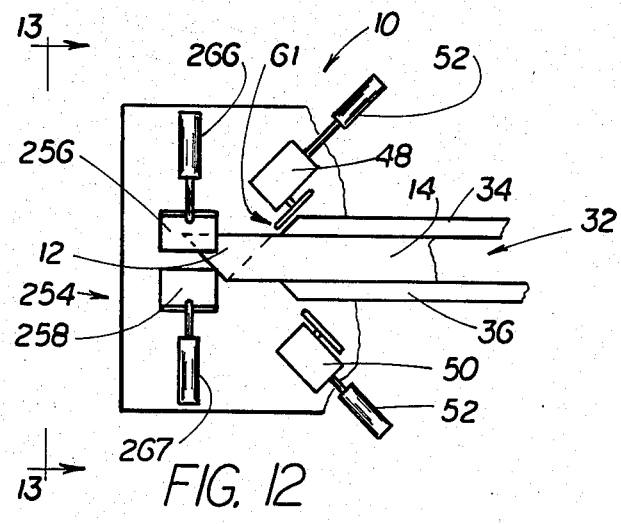
FIG. 12 is a diagrammatic plan view of yet another advantageous embodiment of a workpiece holder in a first position holding a workpiece.
Figure 13:
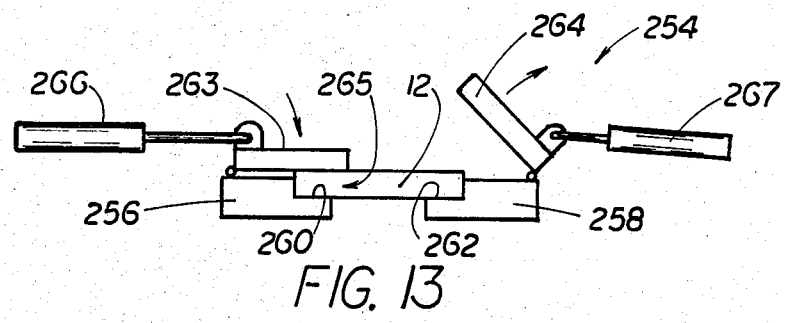
FIG. 13 is an enlarged end view of the workpiece holder of FIG. 12 in the first position.
Figure 15:
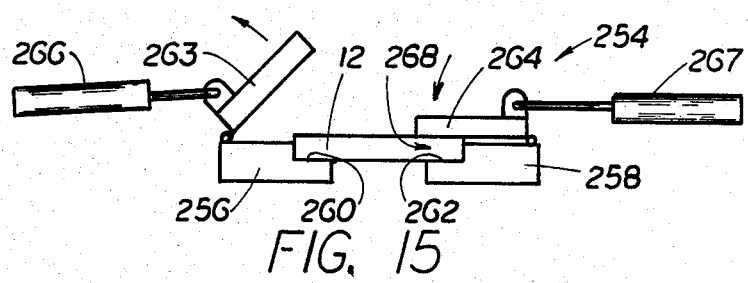
FIG. 15 is an enlarged end view of the workpiece holder of FIG. 14 in the second position.
Figure 14:
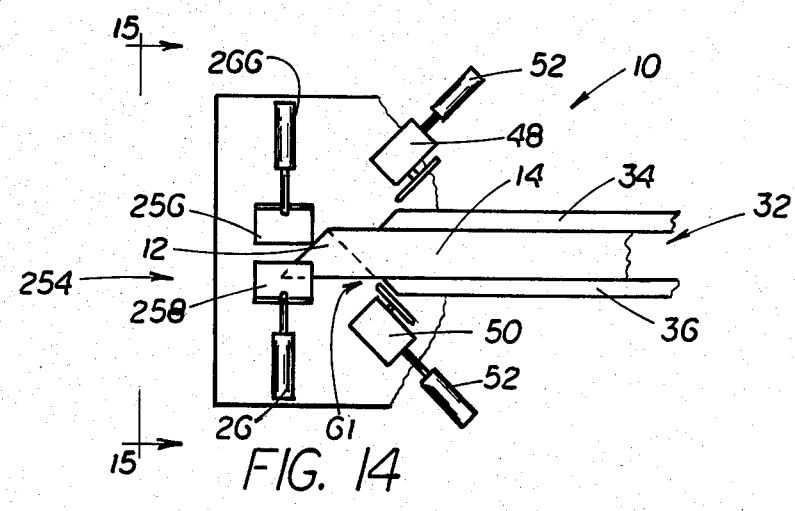
FIG. 14 is a diagrammatic plan view of the workpiece holder of FIG. 12 in a second poistion holding the next sequential workpiece.

In operation of the saw apparatus 10, the stock material 14 is incrementally indexed through the apparatus on the guide rails 34 and 36 past the saws 48 and 50. When a desired length of stock material 14 comprising the workpiece 12 is indexed past the cut-off saws, the channel members 156 and 158 are moved to the first or workpiece support position with the ledges 160 and 162 in general longitudinal alignment with the guide rails 34 and 36, respectively, of the guide means 32 such that at least a portion of each of the opposite longitudinal sides of the portion of the stock material 14 composing the workpiece 12 being cut-off the stock material 14 is supported on the opposite ledges 160 and 162 of the channel members 156 and 158 as shown in FIGS. 7 and 8. One of the saws, for example, saw 48, is moved by the hydraulic cylinder device 52, across the stock material 14 in the space 61 between the adjoining ends of the channel members 156 and guide rail 34 to sever the workpiece 12 from the stock material 14. After the saw 48 is retracted by the hydraulic cylinder device 52, the channel members 156 and 158 of the workpiece holder 154 are simultaneously moved apart or away from each other, by the hydraulic cylinder devices 166 and 167 such that the space between the ledges 160 and 162 is greater than the width of the workpiece 12 supported on the ledges 160 and 162, as shown in FIGS. 9 and 10, to eject the severed workpiece 12. The channel members 156 and 158 of the workpiece holder 154 moves back to the position in alignment with the guide rails 34 and 36, and the stock material 14 is again indexed to position a new portion of material 14 past the saws corresponding to another workpiece 12 to be cut-off. The other saw 50 is moved by the hydraulic cylinder device 66 across the stock material 14 in the space 61 between the adjoining ends of the channel member 58 and the guide rail 36 to sever the workpiece 12 from the stock material 14. After the saw 50 is retracted by the hydraulic cylinder device 52, the channel members 156 and 158 of the work holder 154 again move away from each other transversely with the guide rails 34 and 36, as illustrated in FIG. 10 to eject the severed workpiece 12.

Turning now to FIGS. 12 through 16, there is shown yet another advantageous embodiment of a workpiece holder, generally denoted as the numeral 254, located at the end of the guide means 32 defining the predetermined path of movement of the stock material 14. The workpiece holder 254 includes two spaced apart generally parallel elongated channel members 256 and 258 which are substantially in end to end alignment with the guide rails 34 and 36, respectively. Each side channel member 256 and 258 is formed with a longitudinally extending ledge 260 and 262, respectively. The longitudinal ledges 260 and 262 face each other across the space separating the channel members 256 and 258. The ledges 260 and 262 are in generally longitudinal alignment with the guide rails 34 and 36, respectively. Each of the ledges 260 and 262 is smaller in width of the stock material 14. Thus, the ledges 260 and 262 are adapted to alternately support the opposite longitudinal sides of the part of the stock material 14 composing the workpiece 12 being cut-off the stock material. The channel member 256 includes a top plate 263 pivotally attached to the top surface of the channel member 256 for movement in an arcuate path between a workpiece support position overlaying the ledge 260 (see FIG. 13) and a workpiece release position away from the ledge 260 (see FIG. 15). The channel member 258 includes an identical top plate 264 pivotally attached to the top surface of the channel member 258. When in the workpiece support position, the top plate 263 closes the open top area of the ledge 260 forming a slot 265 in the channel member 256 for receiving and supporting the workpiece 12. The free edge of the top plate 236 extends past the free edge of the ledge 260. Similarly, when in the workpiece support position, the top plate 264 closes the open top area of the ledge 262 in the channel member 258 forming a slot 268 for receiving and supporting the workpiece 12. The free edge of the top plate 264 extends past the free edge of the ledge 262. When the top plate 263 is in the workpiece release position, it is moved away from the open top area of the ledge 260, and the top plate 264 is in the release position it is moved away from the open top area of the ledge 262.

The top plates 264 and 265 of the workpiece holder 254 can be moved by virtually any convenient means. As shown, the top plate 263 is moved by means of a hydraulic or pneumatic cylinder device 266 which has the end of its piston rod connected to the top plate 264, and the top plate 264 is moved by a similar hydraulic or pneumatic cylinder device 267 which has the end of its piston rod connected to the top plate 264.

In operation of the saw apparatus 10, the stock material 14 is incrementally indexed through the apparatus on the guide rails 34 and 36 past the saws 48 and 50. When a desired length of stock material 14, comprising the workpiece 12 is indexed past the cut-off saws, the top plate 263 of the channel member 256 is moved to the workpiece support position by the hydraulic cylinder device 266 to engage one longitudinal side of the portion of the stock material 14 composing the workpiece 12 to be severed from the stock material 14 in the slot 265. One of the saws 48 is moved by hydraulic cylinder device 52 across the stock in the space 61 between the adjoining ends of the channel member 256 and the guide rail 34 to sever the workpiece 12. After the saw 48 is retracted by the hydraulic cylinder device 52, the top plate 263 is moved to the workpiece release position by the cylinder device 266 to allow the severed workpiece 12 to fall off the ledge 260. The stock material is again indexed to position a new portion of the material 14 past the saws corresponding to another workpiece 12 to be cut-off, and the top plate 264 is moved to the workpiece support position by the cyclinder device 267 to engage the other longitudinal side of the portion of the stock material 14 composing the workpiece 12 to be severed from the stock material 14 in the slot 268. The other saw 50 is moved by the cylinder device 66 across the stock material 14 in the space 61 between the adjoining ends of the channel member 258 and guide rail 36 to sever the workpiece 12 from the stock material. After the saw 50 is retracted by the hydraulic cyclinder device 52, the top plate 264 is moved to the workpiece release position by the cylinder device 267 to allow the severed workpiece 12 to fall off of the ledge 262.

The foregoing detailed description is given primarily for clearness of understanding and no limitations are to be understood therefrom for modifications will become obvious to those skilled in the art upon reading this disclosure and may be made without department from the spirit of the invention and scope of the amended claims.

What is claimed:

1. A saw apparatus for cutting a workpiece from a stock of material comprising:
   stock material guide means for guiding the movement of the stock material along a predetermined path;
   a pair of saws located to opposite lateral sides of the path determined by the stock material guide means, each of the saws being adapted for movement across the guide means to cut a workpiece off of the stock material located on the guide means;
   a movable workpiece holder located at the end of the guide means defining the downstream end of the predetermined path movable back and forth in a direction transverse to the predetermined path of the guide means across the downstream end of the predetermined path, adapted to alternately engage opposite sides of and support the portion of the stock material comprising the workpiece being cut-off the stock material; and
   means for ejecting the severed workpiece from the workpiece holder after the workpiece has been cut-off the stock material as the workpiece holder moves the workpiece transversely away from the lateral sides of the guide means.

2. The saw apparatus of claim 1, wherein the stock material guide means comprises two spaced apart, generally parallel guide rails for supporting the stock material.

3. The saw apparatus of claim 2, wherein the stock material guide means further comprises fixture means located proximate the downstream end of the stock material guide rails to laterally engage the stock material therebetween.

4. The saw apparatus of claim 2, further comprising means for adjusting the distance between the guide rails of the stock material guide means.

5. The saw apparatus of claim 1, wherein the movable workpiece holder comprises two spaced apart, generally parallel side channel members, each side channel member having means for engaging a different one of the longitudinal sides of a portion of the stock material comprising the workpiece to be cut-off the stock material.

6. The saw apparatus of claim 5, wherein the engaging means comprises a channel defined in each one of the side channel members, each channel being adapted to receive a different one of the longitudinal sides of the portion of the stock material comprising the workpiece to be cut-off the stock material.

7. The saw apparatus of claim 6, wherein each channel defined in the side channel members is a generally U-shaped channel having one open longitudinal side, and the open longitudinal sides of the channels are in facing relationship to each other across the space between the side channel members.

8. The saw apparatus of claim 7, wherein the workpiece holder is adapted for movement back and forth of the guide means at the downstream end of the predetermined path.

9. The saw apparatus of claim 1, wherein the workpiece ejector means comprises ejector bars which contact the workpiece engaged by the workpiece holder as the workpiece holder moves transversely to force the workpiece out of engagement with the workpiece holder.

10. The saw apparatus of claim 1, wherein:
    the stock material guide means comprises two spaced apart, generally parallel guide rails for supporting the stock material; and,
    the workpiece holder comprises two spaced apart, generally parallel side channel members for alternately engaging a different one of the longitudinal sides of the portion of the stock material comprising the workpiece to be cut off the stock material, the distance between the side channel members being greater than the distance between the guide rails.

11. The saw apparatus of claim 10, wherein the workpiece holder is adapted for movement transversely to alternately position one of the side channel members in general longitudinal alignment with one of the guide rails, and the other one of the side channel members in general longitudinal alignment with the other one of the guide rails.

12. The saw apparatus of claim 11, wherein when a side channel member is in general longitudinal alignment with a guide rail, there is a space between the adjoining ends of the longitudinally aligned side channel member and guide rail large enough to receive therethrough a saw.

13. The saw apparatus of claim 6, wherein the workpiece ejector means pushes a workpiece out of a channel in a side channel means as the workpiece holder moves transversely.

14. The saw apparatus of claim 13, wherein the workpiece ejector means comprises:
    apertures defined through each side channel member into the channel defined therein; and
    a stationary ejector bar located near each side channel member and positioned to be received through the aperture in the side channel member as the workpiece holder moves transversely to contact a workpiece received in the channel and push the workpiece out of the channel.

15. The saw apparatus of claim 1, further comprising workpiece conveying means located beneath the workpiece holder for receiving a workpiece ejected from the workpiece holder and moving the workpiece to another location.

16. The saw apparatus of claim 15, wherein the workpiece conveying means comprises an endless belt conveyor device.

17. The saw apparatus of claim 16, wherein the workpiece endless belt conveyor device comprises two spaced apart endless conveyor bands, and the space between the endless bands be selected to allow workpiece smaller than the preselected size to pass therebetween.

18. The saw apparatus of claim 5, wherein the side channels are adapted to concurrent movement toward and away from each other between a first position wherein the space between the side channel is less than the width of the stock material and a second position wherein the space between the side channels is greater than the width of the stock material.

19. The saw apparatus of claim 5, wherein the means for engaging a different one of the longitudinal sides of the stock material comprises a ledge formed in each of the channel members, and a top plate movably attached to the top surface of each of the channel members for movement between a first position overlying the ledge and a second position away from the ledge.

* * * * *